(12) United States Patent
Chen et al.

(10) Patent No.: US 11,235,321 B2
(45) Date of Patent: Feb. 1, 2022

(54) MICROFLUIDIC CHIP WITH SEALED ON-BOARD REAGENT

(71) Applicant: Siemens Healthcare Diagnostics Inc., Tarrytown, NY (US)

(72) Inventors: Dafeng Chen, Sharon, MA (US); James E. Rasmussen, Plainville, MA (US); Manish Deshpande, Newton, MA (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 204 days.

(21) Appl. No.: 16/598,363

(22) Filed: Oct. 10, 2019

(65) Prior Publication Data

US 2020/0038855 A1   Feb. 6, 2020

Related U.S. Application Data

(63) Continuation of application No. 14/775,338, filed as application No. PCT/US2014/025281 on Mar. 13, 2014, now Pat. No. 10,441,951.

(Continued)

(51) Int. Cl.
  *B01L 3/00*   (2006.01)

(52) U.S. Cl.
  CPC ....... *B01L 3/5027* (2013.01); *B01L 3/502715* (2013.01); *B01L 3/523* (2013.01);
(Continued)

(58) Field of Classification Search
  CPC .. B01L 3/5027; B01L 3/502715; B01L 3/523; B01L 2300/123; B01L 2300/0816; B01L 2400/0683; B01L 2400/0481; B01L 2300/0867; B01L 3/502738; B01L 2200/10; B01L 2200/16; B01L 2300/0672; F16K 99/003; F16K 2099/008; F16K 2099/0084

See application file for complete search history.

(56) References Cited

U.S. PATENT DOCUMENTS 4,965,047 A   10/1990 Hammond
5,176,634 A   1/1993 Smith et al.
(Continued)

FOREIGN PATENT DOCUMENTS

CN   1922049 A   2/2007
CN   101309754 A   11/2008
(Continued)

OTHER PUBLICATIONS

International Search Report and Written Opinion of International Application No. PCT/US2014/025281 dated Jul. 17, 2014.

(Continued)

*Primary Examiner* — Samuel P Siefke

(57) ABSTRACT

A microfluidic product pouch assembly may be used in a microfluidic chip. The microfluidic product pouch may include a pouch surrounding an inner chamber and having a rupturing portion and an inner membrane positioned within the inner chamber. The inner membrane may separate the inner chamber into a first cavity and a second cavity. A reagent may be positioned within the first cavity and/or the second cavity. The microfluidic product pouch assembly may also include a rupturing structure. The rupturing structure may be configured to selectively break the rupturing portion of the microfluidic product pouch.

8 Claims, 5 Drawing Sheets

Related U.S. Application Data

(60) Provisional application No. 61/783,287, filed on Mar. 14, 2013.

(52) U.S. Cl.
CPC ..... *B01L 3/502738* (2013.01); *B01L 2200/10* (2013.01); *B01L 2200/16* (2013.01); *B01L 2300/0672* (2013.01); *B01L 2300/0816* (2013.01); *B01L 2300/0867* (2013.01); *B01L 2300/123* (2013.01); *B01L 2400/0481* (2013.01); *B01L 2400/0683* (2013.01)

(56) References Cited

U.S. PATENT DOCUMENTS

| | | | |
|---|---|---|---|
| 5,258,314 | A | 11/1993 | Skerratt |
| 5,593,804 | A | 1/1997 | Chemelli et al. |
| 6,159,747 | A | 12/2000 | Harttig et al. |
| 6,264,900 | B1 | 7/2001 | Schubert et al. |
| 6,916,113 | B2 | 7/2005 | Van de Goor et al. |
| 7,060,225 | B2 | 6/2006 | Niehaus |
| 8,012,745 | B2 | 9/2011 | Glezer et al. |
| 8,105,849 | B2 | 1/2012 | McDevitt et al. |
| 2004/0034328 | A1 | 2/2004 | Unger et al. |
| 2009/0194533 | A1 | 8/2009 | Lizerbram et al. |
| 2010/0112723 | A1 | 5/2010 | Battrell et al. |
| 2010/0291588 | A1 | 11/2010 | McDevitt et al. |
| 2011/0166748 | A1 | 7/2011 | Schneider et al. |
| 2011/0186466 | A1 | 8/2011 | Kurowski et al. |
| 2012/0074176 | A1 | 3/2012 | Sullivan et al. |
| 2012/0156750 | A1 | 6/2012 | Battrell et al. |

FOREIGN PATENT DOCUMENTS

| | | |
|---|---|---|
| CN | 101641071 A | 2/2010 |
| CN | 102582440 A | 7/2012 |
| CN | 102740976 A | 10/2012 |
| CN | 202541328 U | 11/2012 |
| JP | 2009113616 A | 5/2009 |
| WO | 2010040103 A1 | 4/2010 |
| WO | 2011094577 A2 | 8/2011 |

OTHER PUBLICATIONS

Chang-Chun et al., "Fabrication Technology of Polydimethylsiloxane Microfluidic Chip", 2004, Journal of Transducer Technology, No. 7, vol. 23, pp. 77-80, See English Abstract.

Xing et al., "Microfludic Biochip for Blood Cell Lysis", Nov. 2006, Chinese Journal of Analytical Chemistry, vol. 34, pp. 1656-1660, See English Abstract.

Xing et al., "Microfludic Biochip for Blood Cell Lysis", Nov. 2006, Science Direct—Chinese Journal of Analytical Chemistry, vol. 34, No. 11, pp. 1656-1660, English Edition.

European Search Report of Application No. EP 14773692.0 dated Dec. 1, 2016.

European Search Report and Written Opinion of Application No. EP 14773692.0 dated Mar. 7, 2017.

First European Office Action of European Application No. 18171255.5 dated Nov. 19, 2018.

European Intention to Grant of European Application No. 18171255.5 dated May 3, 2019.

European Decision to Grant of European Application No. 18171255.5 dated Sep. 12, 2019.

MICROFLUIDIC CHIP WITH SEALED ON-BOARD REAGENT

CROSS REFERENCE TO RELATED APPLICATIONS

This application is a Continuation of U.S. Ser. No. 14/775,338, filed on Sep. 11, 2015, U.S. Pat. No. 10,441,951 which claims benefit of U.S. National Stage of International Application No. PCT/US2014/025281, filed Mar. 13, 2014 and claims priority to U.S. Provisional Application Ser. No. 61/783,287, filed on Mar. 14, 2013. All applications are incorporated by reference herein in their entirety.

BACKGROUND

Microfluidic channels and chambers are interconnected to construct microfluidic devices (hereinafter referred to as "microfluidic chips"). Generally, microfluidic chips receive a sample (e.g., blood, bodily fluids) for reaction and/or detection within the device. For example, through a chemical interaction provided within the device, a signal is provided that is proportional to an analyte in the sample to be detected.

Reaction within the microfluidic chip is provided by mixing the sample with one or more reagents. Reagent storage on microfluidic devices is generally a cumbersome process. Assembly of the microfluidic devices is needed in humidity controlled environments. Additionally, the microfluidic devices need to be sealed in packaging that prevents, if not eliminates, light ingress. Even in use, unsealing a microfluidic device from a package is performed such that the device is not exposed to excessive humidity and light.

Foil pouches for reagent storage are used within the industry to protect against humidity, light, and the like. These pouches are opened by the application of a pressure in excess of the burst pressure such that the reagent may be released into the sample. For example, blister pouches are used within the industry to deliver reagents. See, for example, U.S. Pat. Nos. 6,159,747, 8,012,745, 8,105,849, 6,264,900, and 7,060,225. These pouches, however, are not designed for the use of dry reagents.

Dry reagents allow for a longer shelf life. In using dry reagents, however, applying pressure in excess of the burst pressure may not release the majority of the dry reagent from the pouch using current designs within the industry. This may interfere with the intended reaction between the sample fluid and reagent within the microfluidic chip.

Other methods within the industry for opening pouches (e.g., spikes, rollers, surface tension), also may not release the majority of the dry reagent from the pouch. See, for example, U.S. Pat. Nos. 4,965,047, 5,258,314, 7,060,225, and 6,916,113.

BRIEF DESCRIPTION OF THE SEVERAL VIEWS OF THE DRAWINGS

To assist those, of ordinary skill in the relevant art in making and using the subject matter hereof, reference is made to the appended drawings. The drawings are not intended to be drawn to scale. Like reference numerals may refer to similar elements for clarity and/or consistency. For purposes of clarity, not every component may be labeled in every drawing.

DETAILED DESCRIPTION

Figure 1:
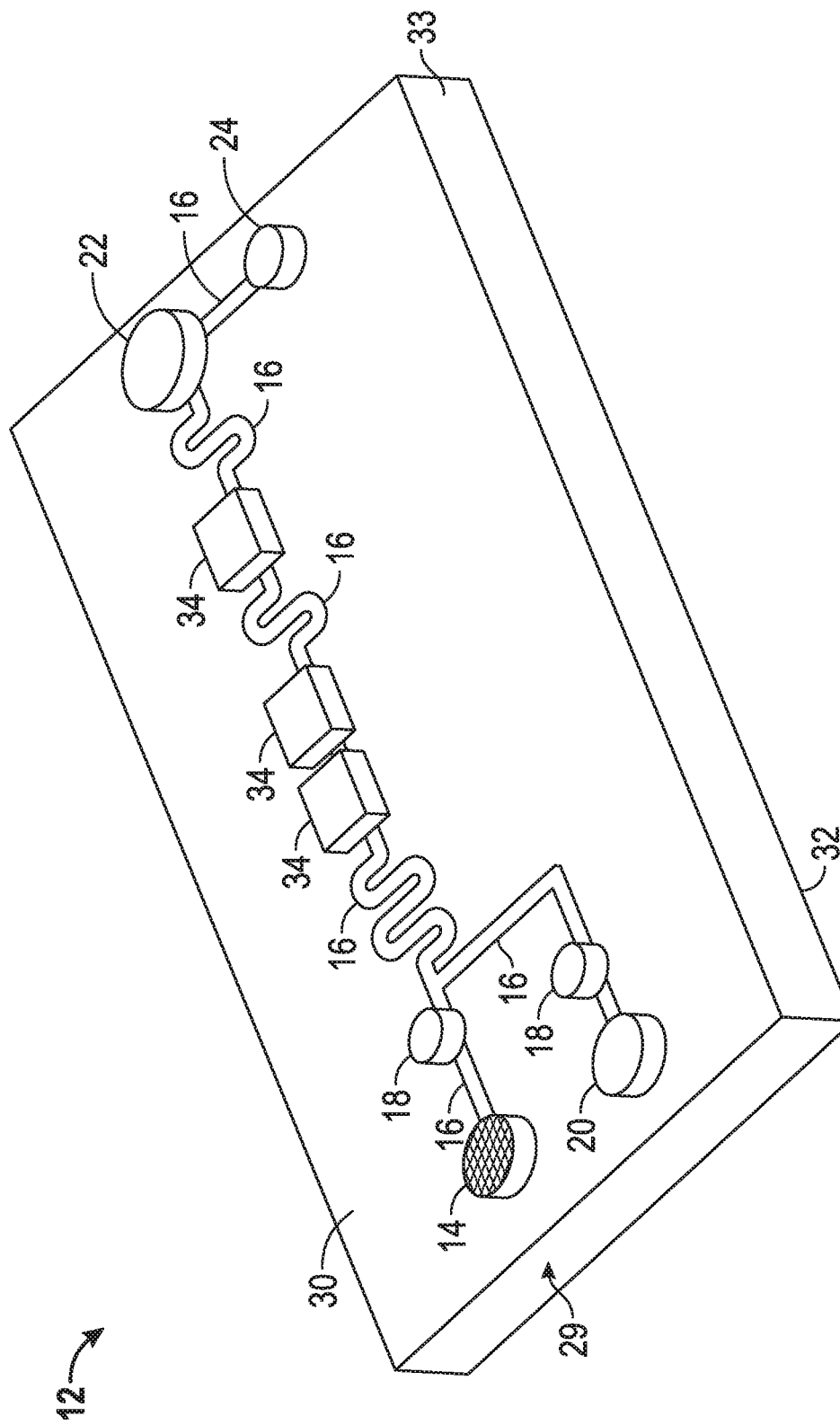
FIG. 1 is a schematic perspective view of an exemplary embodiment of a microfluidic chip constructed in accordance with the inventive concepts disclosed herein.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. Also, it is to be understood that the phraseology and/or terminology employed herein is for purposes of description and should not be regarded as limiting, unless otherwise noted.

The following detailed description refers to the accompanying drawings. The same reference numbers in different drawings may identify the same or similar elements.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements, but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular may also include the plural unless it is obvious that it is meant otherwise. Further, use of the term "plurality" is meant to convey "more than one" unless expressly stated to the contrary.

As used herein, any reference to "one embodiment," "an embodiment," or "some embodiments," means that a particular element, feature, structure or characteristic described in connection with the embodiment is included in at least one embodiment. The appearance of the phrase "in one embodiment," "in an embodiment," and "some embodiments" in various places in the specification are not necessarily all referring to the same embodiment.

Referring to the Figures, and in particular to FIG. 1, illustrated therein is a diagrammatic perspective view of an exemplary embodiment of a microfluidic chip 12 in accordance with the present invention. The microfluidic chip 12 may be a device capable of integrating one or more laboratory functions on a single microfluidic device. As one skilled in the art will appreciate, the arrangement of elements within the microfluidic chip 12 may include a variety of fluid path configurations and fluidic control, with placement of elements at different positions on the microfluidic chip 12. As such, the design of the microfluidic chip 12, illustrated in FIG. 1, is a representation, and as such, the design of the microfluidic chip 12 is not limited to the configuration illustrated.

Generally, the microfluidic chip 12 may include one or more sample ports 14, one or more channels 16, one or more valves 18, one or more vents 20, one or more detection chambers 22, one or more waste receptacles 24, and/or the like. Additionally, the microfluidic chip 12 may include one or more pumps, optical chambers, displacement chambers, deformable chambers, heating chambers, reaction chambers, mixers, and/or the like. Such elements may be interconnected through the one or more channels 16.

In some embodiments, the arrangement of elements within the microfluidic chip 12 may include a linear flow design. For example, the arrangement of elements within the microfluidic chip 12 may be such that fluid provided to the sample port 14 may follow a single direction flow to the detection chamber 22. The single direction flow may minimize the use of valves within the microfluidic chip 12, and as such, may simplify microfluidic flow control, improve throughput, and/or the like.

The microfluidic chip 12 may include a housing 29, a first surface 30, an opposing second surface 32, and an outer peripheral edge 33. The first surface 30, the second surface 32, and/or the outer peripheral edge 33 may be formed of materials including, but not limited to, polymers, elastomers, and/or the like.

In some embodiments, the first surface 30, the second surface 32, and/or the outer peripheral edge 33 may be formed of a flexible membrane. Generally, the flexible membrane may be formed of a deformable material. For example, in some embodiments, at least portions of the flexible membrane may be formed of deformable material capable of returning to its original configuration. If the flexible membrane is displaced, the materiality of the flexible membrane may provide for the flexible membrane to return to its original configuration such that deformation may occur again.

In some embodiments, the first surface 30, the second surface 32, and/or the outer peripheral edge 33 may be formed of a flexible yet pierceable material, penetrable material, a rigid material, and/or a rigid yet pierceable and/or penetrable material. For example, the first surface 30, the second surface 32, and/or the outer peripheral edge 33 may be formed of materials including, but not limited to, polyethylene (PET), polypropylene (PP), acrylic, polycarbonate, copolymer, acrylonitrile butadiene styrene (ABS), and/or the like.

Figure 2:
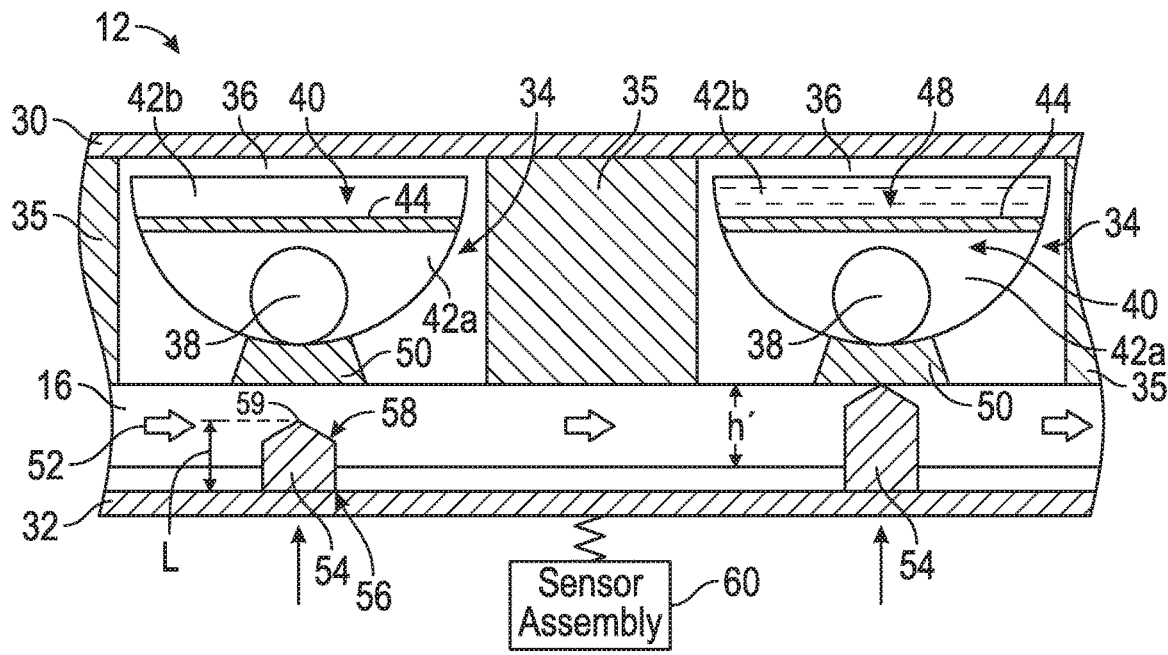
FIG. 2 is a diagrammatic cross-sectional view of two exemplary embodiments of product pouch assemblies for the microfluidic chip illustrated in FIG. 1. The product pouch assemblies include pins as pouch rupturing structures.

Referring to FIGS. 1 and 2, the microfluidic chip 12 may include one or more on-board product pouch assemblies 34 positioned adjacent to one or more channels 16. In some embodiments, two or more product pouch assemblies 34 may be positioned adjacent to one another with a substrate 35 positioned there between. In some embodiments, the product pouch assembly 34 may be a single pouch surrounded by the substrate 35. The substrate 35 may be formed of materials including, but not limited to, acrylic, polycarbonate, copolymer, ABS, and/or the like.

The product pouch assembly 34 may include a pouch 36. Sealed within the pouch 36, depicted in FIG. 2, may be one or more reagents 38, diluents 48, and/or the like. Generally, pouches 36 are sealed containers that may be unsealed by the use of mechanical force, for example, such that the one or more products such as reagents 38, diluents 48, and/or the like may be dispensed into the one or more channels 16 of the microfluidic chip 12. Unsealing may be accomplished by piercing, penetration, breaking, and/or the like.

In some embodiments, one or more product pouch assemblies 34 may be positioned between the first surface 30 and the second surface 32 of the microfluidic chip 12. Additionally, each product pouch assembly 34 may be positioned within the housing 29 and adjacent to one or more channels 16, chambers 22, and/or the like. For example, as illustrated in FIG. 2, one or more product pouch assemblies 34 may be positioned such that the entire product pouch assembly 34 may be encased within the housing 29 of the microfluidic chip 12 between the first surface 30 and the second surface 32, and the pouch 36 may be positioned adjacent to one or more channels 16.

In some embodiments, one or more of the product pouch assemblies 34 may be positioned such that at least a portion of the product pouch assembly 34 is positioned outside of the housing 29, and at least a portion of the product pouch assembly 34 is positioned inside of the housing 29. For example, the product pouch assembly 34 may be positioned outside of the housing 29 of the microfluidic chip 12 such that at least a portion of the product pouch assembly 34 extends beyond the first surface 30, the second surface 32, and/or the outer peripheral edge 33. Additionally, the product pouch assembly 34 may extend such that at least a portion of the product pouch assembly 34 is positioned adjacent to one or more channels 16, the one or more channels 16 being encased within the housing 29 of the microfluidic chip 12.

Generally, the pouch 36 may provide a barrier from moisture content (e.g., humidity), light, oxidation, bacterial contamination, and/or the like. For example, the pouch 36 may provide a barrier for one or more reagents 38, diluents 48, and/or the like, from moisture content (e.g., humidity), light, oxidation, bacterial contamination, and/or the like. The pouch 36 may be formed of materials including, but not limited to, a polymer, a metal foil (e.g., Al), and/or the like. For example, the pouch 36 may include an external layer of aluminum foil and an internal layer of PET or PP. In some embodiments, the pouch 36 may be formed of non-foil materials. Additionally, in some embodiments, the pouch 36 may be formed of materials having low water vapor transmission rates.

Generally, the pouch 36 may form an outer boundary of an inner chamber 40 for housing the one or more reagents 38, diluents 48, and/or the like. The size and shape of the inner chamber 40 may be such that the volume of the inner chamber 40 may be capable of housing the one or more reagents 38, diluents 48, and/or the like. The pouch 36 may form the inner chamber 40 in any geometrical formation. For example, the inner chamber 40 may be a spherical shape, a rectangular shape, a cubical shape, a cylindrical shape, a pyramidal shape, a conical shape, or any fanciful shape.

In some embodiments, the inner chamber 40 may include two or more cavities 42. For example, in FIG. 2, the inner chamber 40 of each product pouch assembly 34 includes a first cavity 42a and a second cavity 42b. The two or more cavities 42 may be separated by one or more inner membranes 44. Generally, the inner membrane 44 may extend the length of the inner chamber 40 so as to separate the inner chamber 40 into the two or more cavities 42. Additional inner membranes 44 may be used to further separate the inner chamber 40 into additional cavities 42.

In some embodiments, the inner membrane 44 may be formed of a frangible material. The frangible material may break into fragments through breaking, distortion, yielding, penetration, piercing, and/or the like. For example, the inner membrane 44 may be formed of materials including, but not limited to, polyethylene, polypropylene, and/or the like. In some embodiments, the inner membrane 44 may be formed of one or more layers of material. For example, the inner membrane 44 may be formed of polyethylene and/or polypropylene materials formable into thin layers.

In some embodiments, the inner membrane 44 may be formed of a pliable material. The pliable material may deform and substantially retain its cohesion through breaking, distortion, yielding, penetration, piercing, and/or the like. For example, the inner membrane 44 may be formed of pliable materials including, but not limited to, elastomers (e.g., thermoplastic elastomers), urethane, and/or similar materials. Each of the cavities 42 may house one or more reagents 38, diluents 48, and/or the like. Reagents 38 may be in a dry formulation, such as, for example, lyophilized spheres, tablets and/or powders, and/or a wet formulation, such as, for example, water, salts, surfactants and/or other compounds.

Generally, the pouch 36 may seal the one or more products within the inner chamber 40. For example sealing the one or more reagents 38 may reduce reagent sensitivity to moisture content (e.g., humidity), light, oxidation, bacterial contamination, and/or the like. Additionally, the one or more reagents 38 may be stored within the product pouch assembly 34 at pre-defined temperatures and/or a pre-defined shelf life. For example, in some embodiments, the one or more reagents 38 may be stored within the product pouch assembly 34 at room temperature and may include a shelf life greater than one year. In some embodiments, extension of the shelf life may be provided by controlling or modifying, materiality of the pouch 36, pressure within the inner chamber 40, reagent volume, reagent volatility, and/or the like.

At least a portion of the pouch 36 may include a rupturing portion 50 positioned adjacent to the one or more of the channels 16. The rupturing portion 50 may be broken (e.g., mechanical force) such that the reagents 38, diluents 48, and/or the like may be dispensed into the one or more channels 16 of the microfluidic chip 12. In some embodiments, the rupturing portion 50 of the pouch 36 may be a membrane formed of a frangible material. The frangible material may break into fragments through breaking, distortion, yielding, penetration, piercing, and/or the like. For example, the rupturing portion 50 of the pouch 36 may be formed of materials including, but not limited to, PEP, PP, metal foil and/or the like. In some embodiments, the rupturing portion 50 of the pouch 36 may be similar in materiality to the inner membrane 44; however, it should be noted that the materiality of the pouch 36 and the inner membrane 44 may be configured differently for different purposes.

In some embodiments, the rupturing portion 50 of the pouch 36 may be formed of a pliable material. The pliable material may deform elastically and substantially retain its cohesion through breaking, distortion, yielding, penetration, piercing, and/or the like. For example, the pouch 36 may be formed of pliable materials including, but not limited to, PEP, PP, and/or the like.

Breaking of the rupturing portion 50 of the pouch 36 may provide for the reagents 38, diluents 48, and/or the like, to mix with fluid 52 within the channel 16 positioned adjacent to the product pouch assembly 34. Generally, the fluid 52 within the channel 16 includes fluid introduced into the sample port 14 of the microfluidic chip 12. Additionally, the fluid 52 may include additional reagents, diluents, and/or the like added during travel through the channels 16 of the microfluidic chip 12. For example, in a linear flow design, the arrangement of elements within the microfluidic chip 12 may be such that the fluid 52 introduced to the sample port 14 may follow a single direction flow to the detection chamber 22. The fluid 52 may be mixed with the reagent(s) 38, diluent(s) 48, and/or the like, from product pouch assemblies 34 as the fluid 52 travels through the channel 16 to the detection chamber 22.

In some embodiments, the microfluidic chip 12 may be read by an instrument using one or more sensor assemblies 60. The sensor assembly 60 may include one or more fluid detectors to determine and/or verify the location of the fluid 52 within the channel 16. For example, the fluid detector may determine and/or verify the fluid 52 is within close proximity to one or more product pouch assemblies 34. The sensor assemblies 60 may be optical sensors, proximity sensors or the like, as well as one or more circuits adapted to retrieve and interpret signals generated by the sensor assemblies 60.

The product pouch assembly 34 may be unsealed by a pouch rupturing structure (e.g., mechanical pusher, plunger, piezoelectric actuator, rollers) using mechanical force, pressure force, and/or the like. For example, the product pouch assembly 34 may be unsealed by a pouch rupturing structure using application of a mechanical force to the rupturing portion 50 of the product pouch assembly 34. The application of the mechanical force may break the rupturing portion 50 of the product pouch assembly 34 releasing contents of one or more cavities 42 into the channel 16.

Referring to FIG. 2, in some embodiments, the pouch rupturing structure configured to break the rupturing portion 50 of the product pouch assembly 34 may include a pin 54. The pin 54 may be a rod-like formation having a first end 56 and a second end 58. Shape of the pin 54 may include, but is not limited to, a spherical shape, a rectangular shape, a cubical shape, a cylindrical shape, a pyramidal shape, a conical shape, or any fanciful shape. The pin 54 may be formed of materials including, but not limited to, a metal, a polymer, and/or the like.

The first end 56 of the pin 54 may include a flat end supported by and/or attached to the housing 29 adjacent to the first surface 30, the second surface 32 and/or the outer peripheral edge 33 of the microfluidic chip 12. For example, in FIG. 2, the first end 56 of the pin 54 is supported by and attached to the housing 29 adjacent to the second surface 32 of the microfluidic chip 12. In some embodiments, the pin 54 may extend outside of the housing 29 of the microfluidic chip 12. For example, the first end 56 of the pin 54 may extend past the first surface 30, the second surface 32 or the outer peripheral edge 33 on the exterior of the microfluidic chip 12.

The second end 58 of the pin 54 may include a penetrating and/or piercing edge 59. The edge 59 may be a sharp edge and/or point edge configured to break the rupturing portion 50 of the product pouch assembly 34. During use, a force may be applied to the first end 56 of the pin 54 such that the edge 59 of the second end 58 of the pin 54 may break the rupturing portion 50 of the product pouch assembly 34. Size and shape of the edge 59 of the pin 54 may be configured such that most, if not all of the contents of one or more contents of the cavities 42 may be released into the channel 16. For example, size and shape of the edge 59 of the pin 54 may be configured such that most, if not all of the reagent 38 in the first cavity 42a may enter the channel 16.

In some embodiments, the length L of the pin 54 may be such that the force applied to the first end 56 of the pin 54 may allow for breaking of the rupturing portion 50 of the pouch 36, and in addition, the force may allow for breaking of the inner membrane 44 of the product pouch assembly 34. For example, the length L of the pin 54 may be greater than the height h of the channel 16.

Breaking the rupturing portion 50 and the inner membrane 44 may provide for reagents 38, diluents 48, and/or the like, from multiple cavities 42 to enter the channel 16. In one example, the reagent 38 may be stored in a dry form in the first cavity 42a. To hydrate the dry reagent 38 in the first cavity 42a, the second cavity 42b may include the diluent 48. The inner membrane 44 may be pierced, penetrated, and/or broken at approximately the same time, or at a time shortly thereafter, as breaking of the rupturing portion 50 of the pouch 36 such that the dry reagent 38 may be hydrated by the diluent 48 and flow into the channel 16. In some embodiments, the hydration of the reagent 38 may ensure at least partial or complete transfer of the reagent 38 into the channel 16.

In another example, the reagent 38 may be stored in a liquid form in the first cavity 42a. Another reagent may be stored in liquid form or dry form in the second cavity 42b. The inner membrane 44 may be pierced, penetrated, and/or broken at approximately the same time as unsealing of the pouch 36 such that the reagent 38 in liquid form in the first cavity 42a may mix with the reagent in liquid form or dry form in the second cavity 42b.

Referring to FIGS. 1 and 2, in use, fluid 52 may enter the sample port 14 of the microfluidic chip 12 and may flow through the channel 16. The sensor assembly 60 may detect and/or verify the position of the fluid 52 within the channel 16. As the fluid 52 moves toward the product pouch assembly 34, a force may be applied to the first end 56 of the pin 54 such that the edge 59 of the second end 58 of the pin 54 may break the rupturing portion 50 of the pouch 36 of the product pouch assembly 34 releasing contents of the first cavity 42a into the channel 16. For example, the edge 59 of the second end 58 of the pin 54 may break the rupturing portion 50 releasing the reagent 38 into the channel 16. In some embodiments, the second end 58 of the pin 54 may break the inner membrane 44, as well as, the pouch 36, releasing contents of the second cavity 42b into the first cavity 42a and the channel 16. For example, in some embodiments, the edge 59 of the second end 58 of the pin 54 may break the inner membrane 44 releasing diluent 48 from the second cavity 42b into the first cavity 42a. The diluent 48 may mix with the reagent 38 prior to, or while entering the channel 16 and both the reagent 38 and the diluent 48 may mix with the fluid 52.

In some embodiments, the fluid 52 may enter the channel 16 or flow through the channel 16 subsequent to the contents of the product pouch assembly 34 entering the channel 16. For example, the fluid 52 may be delivered to the sample port 14 to mix with contents of the first cavity 42a or contents of the first cavity 42a and the second cavity 42b after such contents have been released from the product pouch assembly 34 into the channel 16.

Figure 3:
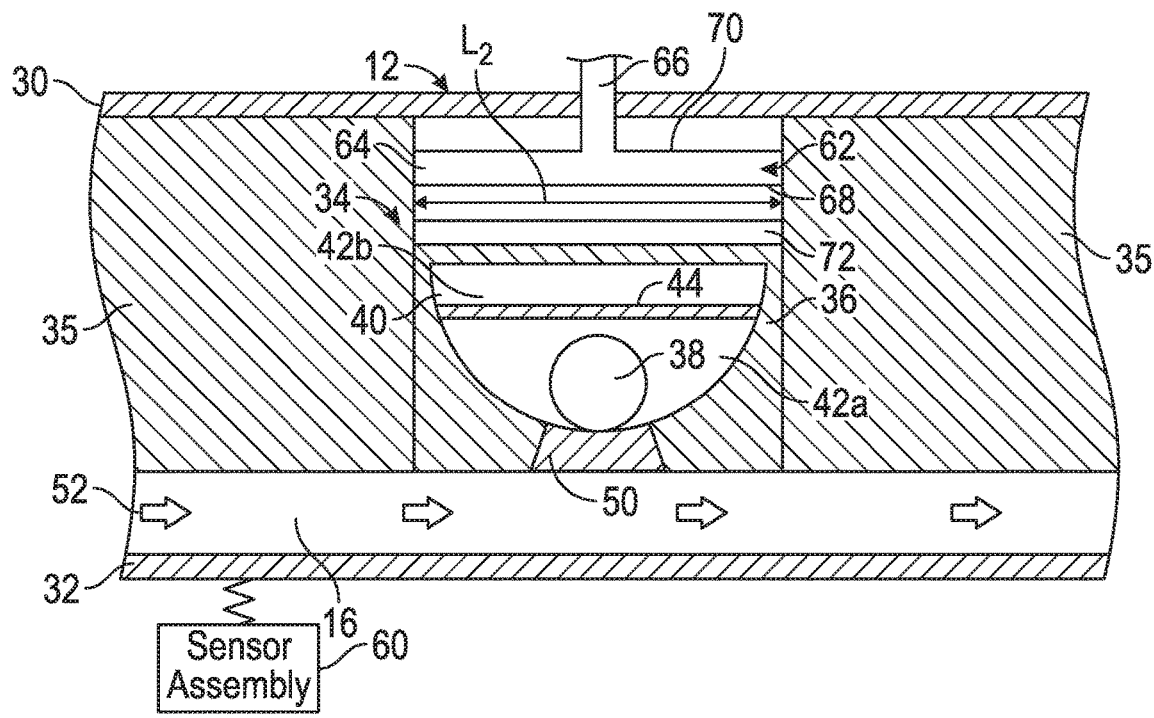
FIG. 3 is a diagrammatic cross-sectional view of another exemplary embodiment of a product pouch assembly for the microfluidic chip illustrated in FIG. 1. The product pouch assembly of FIG. 3 includes a plunger as a pouch rupturing structure.

Referring to FIG. 3, in some embodiments, the pouch rupturing structure configured to break the rupturing portion 50 of the product pouch assembly 34 may include a plunger 62. The plunger 62 may include a contact member 64 attached to or integrally formed with a rod 66. The contact member 64 may include a first surface 68 and an opposing second surface 70. The second surface 70 of the contact member 64 may be attached to or integrally formed with the rod 66.

The first surface 68 of the contact member 64 may contact a deformable membrane 72 of the product pouch. The deformable membrane 72 may be formed of materials including, but not limited to, PET, PP, and/or the like.

The shape of the rod 66 may include, but is not limited to, a spherical shape, a rectangular shape, a cubical shape, a cylindrical shape, a pyramidal shape, a conical shape, or any fanciful shape. The shape of the contact member 64 may include, but is not limited to, a spherical shape, a rectangular shape, a cubical shape, a cylindrical shape, a pyramidal shape, a conical shape, or any fanciful shape. In some embodiments, the materiality of the rod 66 and the materiality of the contact member 64 may be substantially similar. In some embodiments, the materiality of the rod 66 and the materiality of the contact member 64 may be different. Materiality of the rod 66 and/or the contact member 64 may include, but is not limited to, a metal, a polymer, and/or the like.

Referring to FIGS. 1 and 3, in some embodiments, the entire rod 62 may be encased within the microfluidic chip 12. For example, the rod 62 may be supported by the housing 29 adjacent to the first surface 30, the second surface 32, and/or the outer peripheral edge 33 of the microfluidic chip 12. Alternatively, at least a portion of the rod 62 may extend outside of the microfluidic chip 12. For example, a portion of the rod may extend through and/or beyond the first surface 30 (as illustrated in FIG. 3), the second surface 32, and/or the outer peripheral edge 33.

Referring to FIG. 3, the first surface 68 of the contact member 64 may contact a deformable membrane 72 of the product pouch assembly 34 during use. In some embodiments, the first surface 68 of the contact member 64 may be a substantially flat surface. The contact member 64 may extend a length L2 of the product pouch assembly 34 as illustrated in FIG. 3. Alternatively, the contact member 64 may extend a length greater than or less than the length L2 of the product pouch assembly 34.

During use, a force may be applied to the rod 62 such that the first surface 68 of the contact member 64 contacts the deformable membrane 72 of the product pouch assembly 34. When force is applied, the deformable membrane 72 deforms into the second cavity 42b which increases the pressure within the second cavity 42b. The increased pressure within the second cavity causes the inner membrane 44 to deform into the first cavity 42a thereby increasing the pressure within the first cavity 42a to rupture the rupturing portion 50 to release contents of the first cavity 42a into the channel 16.

In some embodiments, the second cavity 42b may be filled with a gas, such as helium, nitrogen and/or air. The gas may be stored in the second cavity 42b under pressure such that rupturing the rupturing portion 50 causes a pressure imbalance whereby the inner membrane 44 deforms into the first cavity 42a and pushes the contents of the first cavity 42a into the channel 16.

Breaking the rupturing portion 50 of the pouch 36 may provide for reagents 38, diluents, and/or the like, to enter the channel 16. In one example, the reagent 38 may be stored in dry form or fluid form in the first cavity 42a. Application of force to the deformable membrane 72 may allow for breaking of the rupturing portion 50 of the pouch 36 such that the reagent 38 in its dry form or fluid form may be released into the channel 16. In another example, the reagent 38 may be stored in dry form in the first cavity 42a and a diluent may be stored in fluid form in the second cavity 42b. Application of force to the deformable membrane 72 may allow for rupturing of the inner membrane 44 and the rupturing portion 50 of the pouch 36 such that the diluent may hydrate the reagent 38 and both the reagent 38 and the diluent may enter the channel 16.

Referring to FIGS. 1 and 3, in use, fluid 52 may enter the sample port 14 of the microfluidic chip 12 and flow through the channel 16. The sensor assembly 60 may detect and/or verify the position of the fluid 52 within the channel 16 and may actuate the movement of the rod 66 of the plunger 62. As the fluid 52 moves toward the product pouch assembly 34, a force may be applied to the rod 66 of the plunger 62 such that the first surface 68 of the contact member 64 may contact the deformable membrane 72 of the product pouch assembly 34. Upon application of the force, the rupturing portion 50 of the pouch 36 may break releasing the contents of the first cavity 42a into the channel 16. The contents of the first cavity 42a may mix with the fluid 52.

In some embodiments, in use, a gas, such as air, helium and/or nitrogen may be stored in the second cavity 42b. As the fluid 52 moves toward the product pouch assembly 34, a force may be applied to the rod 66 of the plunger 62 such that the first surface 68 of the contact member 64 may contact the deformable membrane 72 of the product pouch assembly 34 to break the rupturing portion 50 thereby releasing the contents of the first cavity 42a into the channel 16. The gas within the second cavity 42a may be stored under pressure such that additional pressure may be applied to the first cavity 42a and the entire contents of the first cavity 42a, or substantially all of the contents of the first cavity 42a, may be released into the channel 16. The contents of the first cavity 42a may mix with the fluid 52 within the channel 16.

Figure 4:
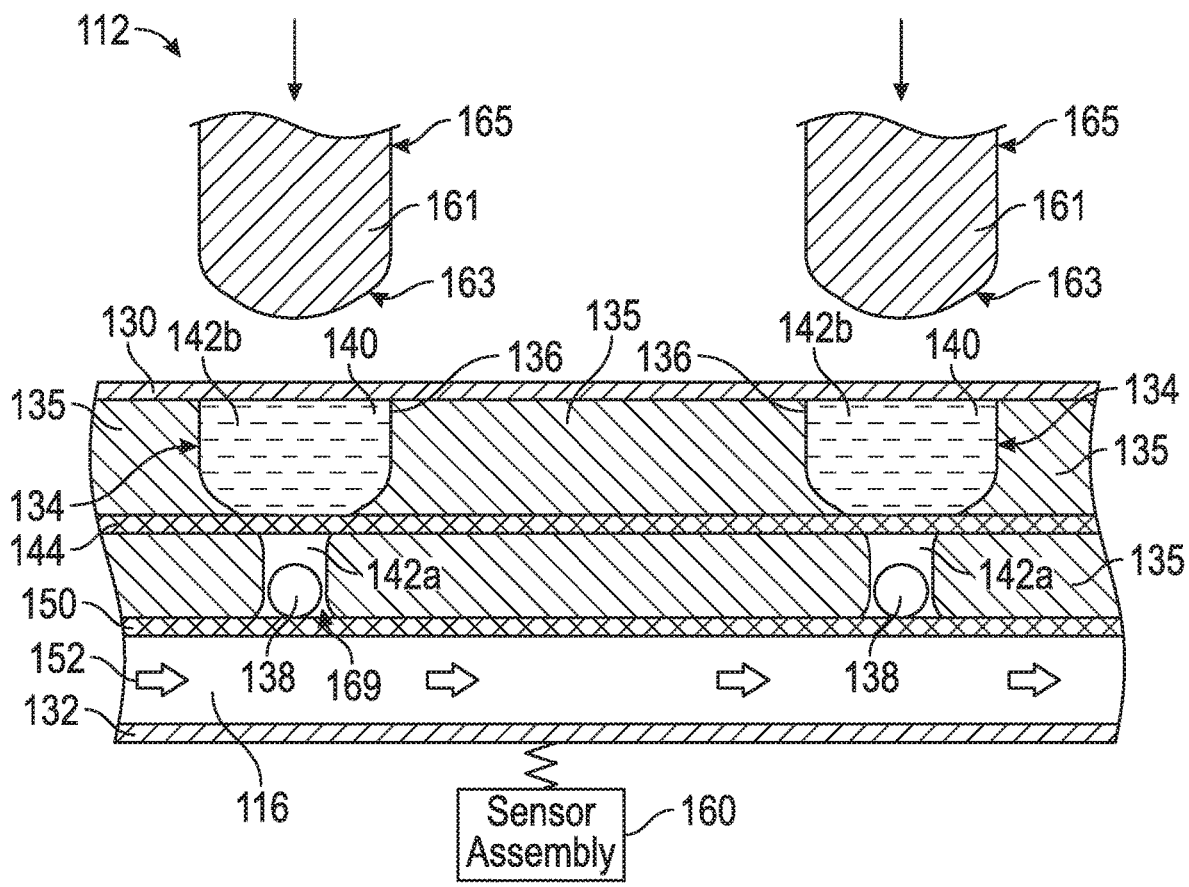
FIG. 4 is a diagrammatic cross-sectional view of two other exemplary embodiments of product pouch assemblies for a microfluidic chip. The product pouch assemblies of FIG. 4 include a plunger as a pouch rupturing structure.

FIG. 4 illustrates another exemplary embodiment of a microfluidic chip 112. The microfluidic chip 112 may include like reference numerals referring to similar elements of the microfluidic chip 12 in FIGS. 1-3 for clarity and/or consistency.

In some embodiments, the microfluidic chip 112 may include one or more product pouch assemblies 134 having an inner membrane layer 144 and/or a rupturing layer 150 of a pouch 136. The inner membrane layer 144 and the rupturing layer 150 may be similar to the inner membrane 44 and the rupturing portion 50 of the pouch 36 of FIGS. 2-3.

The inner membrane layer 144 and the rupturing layer 150 of the pouch 136 may extend outside of an inner chamber 140 of the product pouch assemblies 134 and may extend a length and/or width of the microfluidic chip 112. As such, the inner membrane layer 144 and/or the rupturing layer 150 of the pouch 136 may be formed as one or more layers traversing at least a portion of the microfluidic chip 112. Additionally, the inner membrane layer 144 and/or the rupturing layer 150 of the pouch 136 may from a part of the one or more product pouch assemblies 134. For example, as illustrated in FIG. 4, the inner membrane 144 and the rupturing layer 150 of the pouch 136 may form a part of a first product pouch assembly 134a and a second product pouch assembly 134b. A substrate 135 may be positioned between the inner membrane 144 and the rupturing layer 150. The substrate 135 may be similar to the substrate 35 illustrated in FIGS. 2-3.

The pouch rupturing structure may include a plunger 161 configured to break the rupturing portion 150 of the pouch 136. Generally, the plunger 161 may be depressed to break the inner membrane layer 144 and the rupturing layer 150.

In some embodiments, the inner membrane layer 144 and the rupturing layer 150 may be designed to be sequential in burst pressure. For example, the plunger 161 may initially cause breaking of the inner membrane layer 144 such that the contents of the second cavity 142b (e.g., diluent 148) enters and mixes with contents of the first cavity 142a (e.g., reagent 138). The plunger 161 may then sequentially cause the breaking of the rupturing layer 150 such that the mixture of the first cavity 142a and the contents of the second cavity 142b enter a channel 116 within the microfluidic chip 112. Alternatively, the inner membrane layer 144 and the rupturing layer 150 may be designed to break simultaneously such that the contents of the first cavity 142a and the contents of the second cavity 142b enter the channel 116 at approximately the same time.

The plunger 161 may be a rod-like formation having a first end 163 and a second end 165. Shape of the plunger 161 may include, but is not limited to, a spherical shape, a rectangular shape, a cubical shape, a cylindrical shape, a pyramidal shape, a conical shape, or any fanciful shape. The plunger 161 may be formed of material including, but not limited to, a metal, a polymer, and/or the like.

In some embodiments, the plunger 161 may be designed to limit the amount of contents remaining within the inner chamber 140 after breaking of the rupturing layer 150. The first end 163 of the plunger 161 may be formed to conform to the geometry of the second cavity 142b of the product pouch assembly 134. For example, the first end 163 of the plunger 161 may be considered a male component and the geometry of the second cavity 142b may form a female counterpart to the male component. As illustrated in FIG. 4, the first end 163 of the plunger 161 may include a round edge male component conforming to a rounded geometry of the second cavity 142b female component.

In some embodiments, the plunger 161 may be housed outside of the microfluidic chip 112. For example, as illustrated in FIG. 4, the plunger 161 may be housed outside of the microfluidic chip 112 such that the plunger 161 initially applies pressure to a first surface 130 of the microfluidic chip 112. The pressure may be transferred through the first surface 130 to the product pouch assembly 134. The first surface 130 of the microfluidic chip 112 may be similar to the first surface 30 of the microfluidic chip 12 illustrated in FIGS. 1-3. Alternatively, the plunger 161 may be housed inside the microfluidic chip 112. For example, the second end 165 may be supported and/or attached to a housing 129 of the microfluidic chip 112 adjacent to the first surface 130 of the microfluidic chip 112 similar in design to the pin 54 illustrated in FIG. 2.

In some embodiments, the geometry of the inner chamber 140 may be designed to limit the amount of contents remaining within the inner chamber 140 after breaking of the rupturing layer 150. For example, as illustrated in FIG. 4, the first cavity 142a and the second cavity 142b may form a cone-shaped geometry providing an apex 169 for directing contents of each cavity 142a and 142b into the channel 116. The first cavity 142a may have a smaller cross-sectional area (e.g. diameter) as compared to the second cavity 142b. The contents of the second cavity 142b flow into the first cavity 142a. The change in diameter from the second cavity 142b to the first cavity 142a, in addition to or in lieu of the plunger 161 configured to mate with the first and/or second cavities 142a and 142b may provide for further emptying of the inner chamber 140 at the apex 169 into the channel 116.

Breaking of the inner membrane 144 and the rupturing layer 150 may provide for reagents 138, diluents 148, and/or the like, from multiple cavities 142a and/or 142b to enter the channel 116. In one example, the reagent 138 may be stored in a dry form in the first cavity 142a. Breaking of the inner membrane 114 may provide for a diluent 148 to hydrate the reagent 138 prior to the reagent 138 entering the channel 116. In another example, the reagent 138 may be stored in dry or fluid form in the first cavity 142a. A gas, such as air may be stored in the second cavity 142b under pressure such that upon application of force by the plunger 162 most, if not all, of the contents of the first cavity 142a may be released into the channel 116.

Referring to FIG. 4, in use, fluid 152 may enter the microfluidic chip 112 and flow through the channel 116. In some embodiments, a sensor assembly 160 may detect and/or verify the position of the fluid 152 within the channel 116. As the fluid 152 moves toward the product pouch assembly 134, a force may be applied to the plunger 161 such the first end 163 of the plunger 161 contacts the first surface 130 of the microfluidic chip 112. The first end 163 of the plunger 161 creates additional pressure within the first cavity 142a and the second cavity 142b of the product pouch assembly 134 to cause the inner membrane 144 and/or the rupturing portion 150 to break releasing contents of the first cavity 142a and/or the second cavity 142b into the channel 116.

Figure 5:
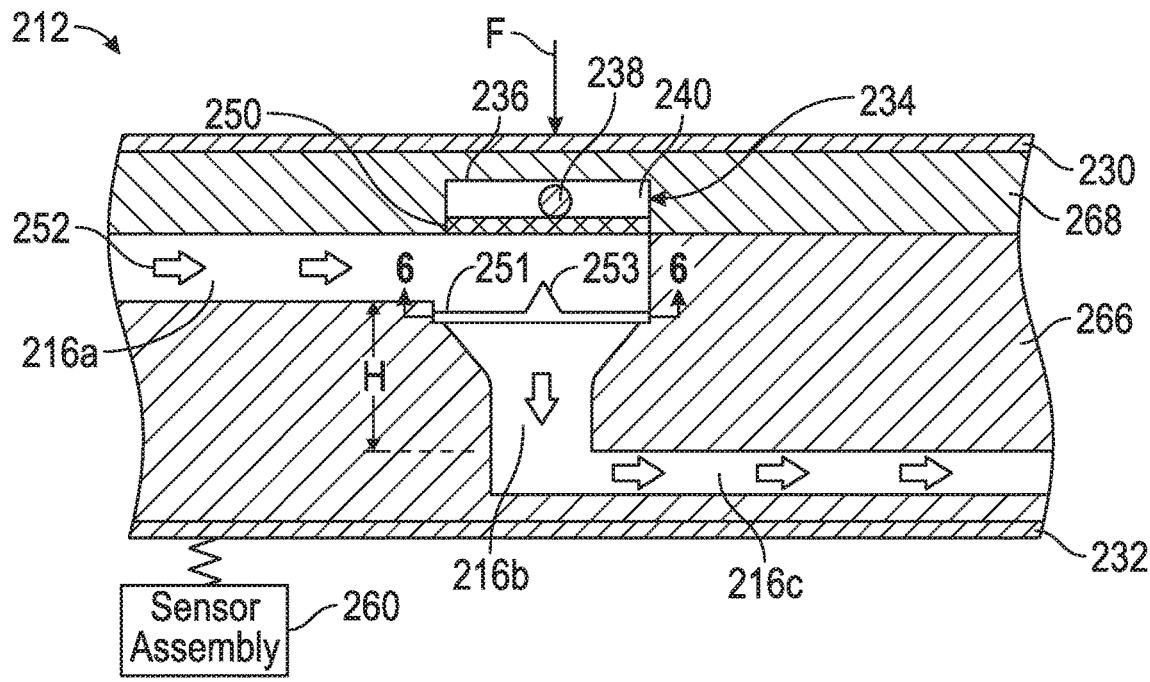
FIG. 5 is a diagrammatic cross-sectional view of yet another exemplary embodiment of a product pouch assembly for a microfluidic chip. The product pouch assembly of FIG. 5 includes a structure having a tip as a pouch rupturing structure.

FIG. 5 illustrates another exemplary embodiment of a microfluidic chip 212 having one or more product pouch assemblies 234. The microfluidic chip 212 may include like reference numerals referring to similar elements of the microfluidic chip 12 in FIGS. 1-3 and the microfluidic chip 112 in FIG. 4 for clarity and/or consistency.

The product pouch assembly 234 may include a pouch 236 formed to seal an inner chamber 240 housing a reagent 238, diluent, and/or the like. In some embodiments, the inner chamber 240 may be backed by a second chamber similar to the multiple cavities 42 described in relation to FIGS. 2-3.

Generally, the pouch 236 of the product pouch assembly 234 may include a rupturing portion 250. The rupturing portion 250 of the product pouch assembly 234 may be positioned adjacent to a channel 216 of the microfluidic chip 212 formed within a substrate 266. The channel 216 may include two horizontal channel segments 216a and 216c connected by a vertical channel segment 216b. The horizontal channel segments 216a and 216c may be separated by a height H. The height H may be determined to provide adequate flow of the fluid 252 through the channel segments 216a, 216b, and 216c. The vertical channel segment 216b may be positioned under the pouch 236.

The product pouch assembly may include a structure 251 having a tip 253 configured to penetrate, pierce, and/or break the rupturing portion 250. The structure 251 may be positioned under the rupturing portion 250 within the vertical channel segment 216b. As fluid 252 within the channel 216 fills the vicinity of the rupturing portion 250, a force may be applied to the pouch 236 such that the pouch 236 is displaced vertically such that the rupturing portion 250 contacts the tip 253 of the molded structure 251 thereby breaking the rupturing portion 250. Breaking the rupturing portion 250 releases the contents of the pouch 236 into the channel 216.

Figure 6:
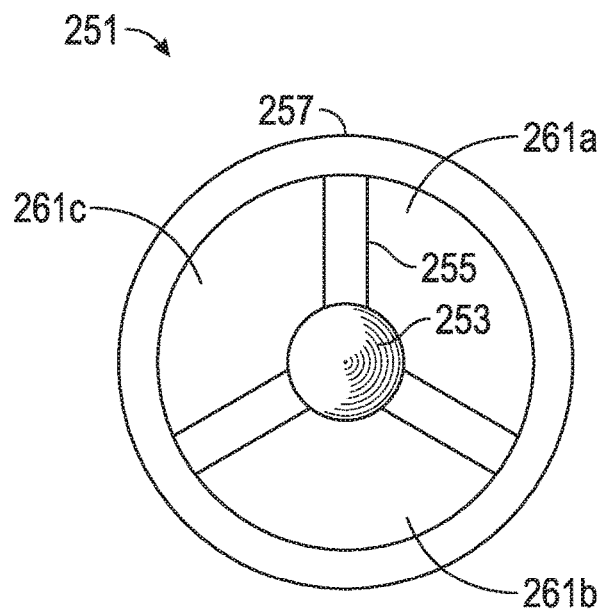
FIG. 6 is a cross-sectional view of the structure of FIG. 5 taken along line 6-6.

Referring to FIGS. 5 and 6, the structure 251 may be formed of two or more spokes 255 connecting the tip 251 to an outer frame 257. The outer frame 257 may be shaped and sized to form fit within the channel 216. For example, in some embodiments, the channel 216 may include a circular diameter, and the outer frame 257 may be a circular formation. In some embodiments, the outer frame 257 may be connected to the substrate 266 so that the tip 251 and the spokes 255 are within the channel 216. For example, the outer frame 257 may be integral to the substrate 266 to form a unitary structure adhered to the substrate 266, and/or the like. In some embodiments, the outer frame 257 may be formed fitted to be within the channel 216 but not attached to the substrate 266.

The tip 253 of the structure 251 may be a sharp edge and/or point edge configured to break the rupturing portion 250 of the pouch 236. Size and shape of the tip 253 may be configured such that upon breaking of the rupturing portion 250, most, if not all of the contents of the inner chamber 240 may be released into the channel 216. For example, size and shape of the tip 253 may be configured such that upon breaking of the rupturing portion 250, the reagent 238 may enter the channel 216. The structure 251 can be formed using any suitable process, such as by molding the structure 251.

Referring to FIGS. 5 and 6, in use, fluid 252 may enter the horizontal channel segment 216a of the microfluidic chip 212. A sensor assembly 260 may detect and/or verify position of the fluid 252 within the horizontal channel segment 216a. The fluid 252 may flow through openings 261a, 261b and 261c between the spokes 255 and the frame 257 of the molded structure 251 within the vertical channel segment 216b and into the horizontal channel segment 216c. As the fluid moves toward the product pouch assembly 234, a force F may be applied downward on a surface 230 to move the pouch 236 downwardly such that the tip 253 of the molded structure 251 contacts the rupturing portion 250 of the pouch 236. The tip 253 may break the rupturing portion 250 of the product pouch 236 such that contents of the inner chamber 240 may be released into the horizontal channel segment 216a. The contents of the inner chamber 240 may mix with the fluid 252 and flow between the spokes 255 and the frame 257 of the molded structure 251 within the vertical channel segment 216c and into the horizontal channel segment 216c.

Figure 7:
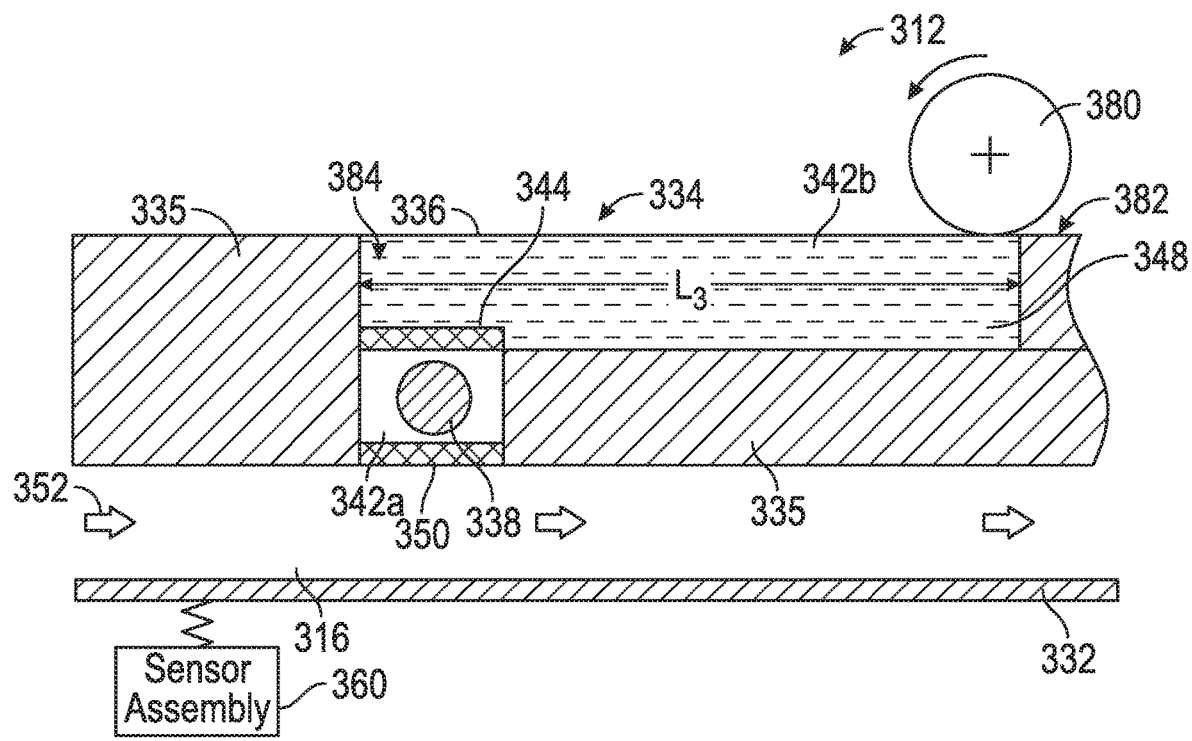
FIG. 7 is a diagrammatic cross-sectional view of yet another exemplary embodiment of a product pouch assembly for a microfluidic chip. The product pouch assembly of FIG. 7 includes a roller as a pouch rupturing structure.

FIG. 7 illustrates another exemplary embodiment of a microfluidic chip 312 having a product pouch assembly 334. The microfluidic chip 312 may include like reference numerals referring to similar elements of the microfluidic chip 12 shown in FIGS. 1-3, the microfluidic chip 112 in FIG. 4, and the microfluidic chip 212 in FIG. 5 for clarity and/or consistency.

Generally, the product pouch assembly 334 includes pouch 336 forming an inner chamber 340. The inner chamber 340 may be separated into a first cavity 342a and a second cavity 342b. The first cavity 342a and the second cavity 342b may be separated by an inner membrane 344. At least a portion of the pouch 336 may include a rupturing portion 350. The rupturing portion 350 may break such that reagents 338, diluents 348, and/or the like may be dispensed into the one or more channels 316 of the microfluidic chip 312.

In some embodiments, the reagent 338 may be stored in the first cavity 342a and the diluent 348 may be stored in the second cavity 342b. The second cavity 342b may be an elongated cavity having a first end 382, a second end 384, and a length L3 spanning from the first end 382 to the second end 384 as illustrated in FIG. 7.

The product pouch assembly 334 includes a roller 380 to provide displacement of the pouch 336 of the product pouch assembly 334 from the first end 382 of the second cavity 342b to the second end 384 of the second cavity 342b. The displacement may apply additional pressure to the second cavity 342b sufficient to break the inner membrane 344 between the second cavity 342b and the first cavity 342a to release contents of the second cavity 342b into the first cavity 342a. The roller 380 may continue to be displaced to apply pressure to the rupturing portion 350 to cause the rupturing portion 350 to break thereby releasing the contents of the first cavity 342a into the channel 316.

A substrate 335 may support the product pouch assembly 334 within the microfluidic chip 312. For example, the substrate 335 may be positioned below the first end 382 of the second cavity 342b to support the second cavity 342b as pressure is applied by the roller 380. The substrate 335 may be similar to the substrate 35 illustrated in FIGS. 2-3.

Referring to FIG. 7, in use, fluid 352 may enter the channel 316 of the microfluidic chip 312. A sensor assembly 360 may detect and/or verify the position of the fluid 352 within the channel 316 and send an appropriate signal to cause movement of the roller 380. As the fluid 352 moves toward the product pouch assembly 334, the roller 380 may rotate and move from the first end 382 of the second cavity 342b to the second end 384 of the second cavity 342b thereby applying pressure to the second cavity 342b. The pressure may cause the inner membrane 344 to break releasing the contents (e.g., diluent 348) into the first cavity 342a. The roller 380 may continue to rotate and move towards the second end 384 of the second cavity 342b applying pressure to break the rupturing portion 350 and release contents (e.g., reagent 338 and diluent 348) into the channel 316. The contents of the first cavity 342a may mix with the fluid 352 and continue through the channel 316.

Figure 8:
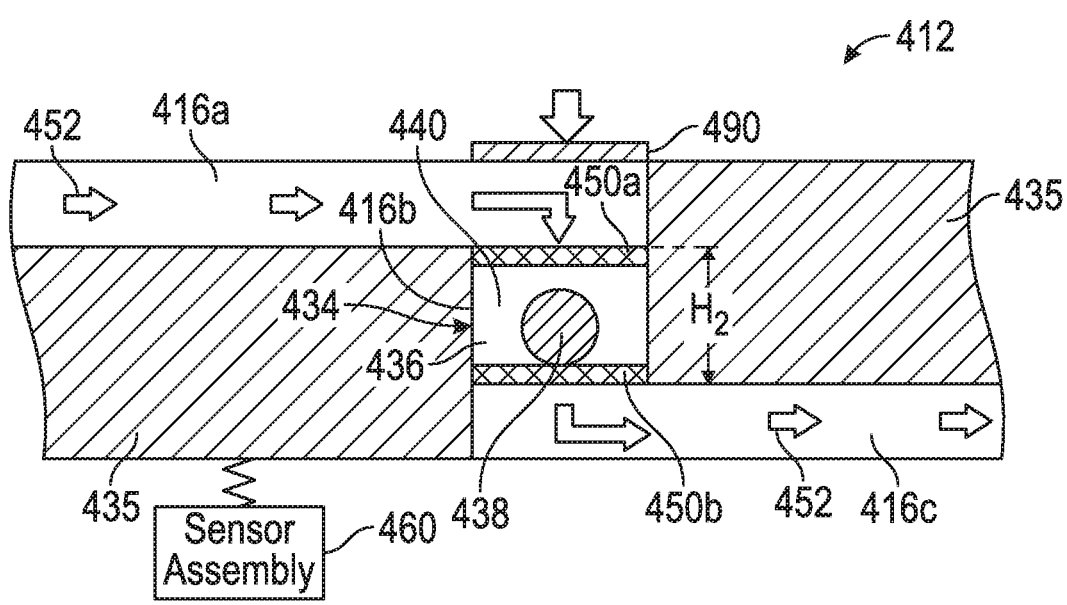
FIG. 8 is a diagrammatic cross-sectional view of yet another exemplary embodiment of a product pouch assembly for a microfluidic chip. The product pouch assembly of FIG. 8 includes a displacement membrane as a pouch rupturing structure.

FIG. 8 illustrates another exemplary embodiment of a microfluidic chip 412 having a product pouch assembly 434. The microfluidic chip 312 may include like reference numerals referring to similar elements of the microfluidic chip 12 shown in FIGS. 1-3, the microfluidic chip 112 in FIG. 4, the microfluidic chip 212 in FIG. 5, and the microfluidic chip 312 in FIG. 7 for clarity and/or consistency.

The product pouch assembly 434 may include pouch 436. The pouch 436 may include two or more rupturing portions 450. For example, in FIG. 8, the product pouch assembly 434 includes a first rupturing portion 450a and a second rupturing portion 450b. The pouch 436 may be formed to seal an inner chamber 440. The inner chamber 440 may house one or more reagents 438, diluents, and/or the like. In some embodiments, the inner chamber 440 may be separated into two or more cavities similar to the cavities 42 illustrated in FIGS. 2-3.

The channel 416 of the microfluidic chip 412 may include two channel segments 416a and 416c that are separated by the first rupturing portion 450a, the inner chamber 440 and the second rupturing portion 450b. For example, the channel segments 416a and 416c may have a major axis extend horizontally. The channel segments 416a and 416c may be in parallel and connected by a channel segment 416b upon rupturing the first rupturing portion 450a and the second rupturing portion 450b. The channel segment 416b may extend at 90 degrees relative to the channel segments 416a and 416c. For example, the channel segment 416b may extend vertically when the channel segments 416a and 416b extend horizontally. The channel segments 416a and 416c may be separated by a height H2. The height H2 may be determined to provide adequate flow of the fluid 252 and the contents of the inner chamber 440 through the channel segments 416a-416c.

Generally, the product pouch assembly 434 may be positioned within the channel 416 of the microfluidic chip 412. For example, the product pouch assembly 434 may be positioned within the vertical channel segment 416b. The product pouch assembly 434 may be structured such that the product pouch assembly 434 may be inserted within the channel 416. Additionally, the product pouch assembly 434 may be structured to minimize dead space within the channel 416 and/or the microfluidic chip 412. For example, the product pouch assembly 434 may be structured to prevent inadvertently trapping the fluid 452 flowing through the vertical channel segment 416b. Such trapping may lead to a loss of sample.

A displacement membrane 490 may be positioned on the exterior of the horizontal channel segment 416a and adjacent to the product pouch assembly 434. For example, the displacement membrane 490 may be positioned above the product pouch assembly 434. The displacement membrane 490 may be formed of materials including, but not limited to, PET, PP, and/or the like.

In some embodiments, a force may be applied to the displacement membrane 490 such that pressure is applied within the channel segment 416a and/or the vertical channel segment 416b. The pressure may cause the rupturing portions 450a and 450b to break such that fluid 452 flowing through the channel segments 416a-416c may mix with the contents of the inner chamber 440.

Referring to FIG. 8, in use, fluid 452 may enter the horizontal channel segment 416a of the microfluidic chip 412. A sensor assembly 460 may detect and/or verify position of the fluid 452 within the horizontal channel segment 416a. As the fluid 452 approaches the product pouch assembly 434, a force may be applied to the displacement membrane 490. Pressure resulting from the force on the displacement membrane 490 may cause breakage of the first rupturing portion 350a and the second rupturing portion 350b to permit the fluid 452 to flow from the channel segment 416a to the channel segment 416c through the channel segment 416b to mix with the contents of the inner chamber 440. The resulting mixture may continue to flow through the channel segment 416c to a reaction chamber, for example, of the microfluidic chip 412.

From the above description, it is clear that the inventive concept(s) disclosed herein are well adapted to carry out the objects and to attain the advantages mentioned herein, as well as those inherent in the inventive concept(s) disclosed herein. While the embodiments of the inventive concept(s) disclosed herein have been described for purposes of this disclosure, it will be understood that numerous changes may be made and readily suggest to those skilled in the art which are accomplished within the scope and spirit of the inventive concept(s) disclosed herein and defined by the appended claims.

The invention claimed is:

1. A microfluidic product pouch assembly for use in a microfluidic chip, comprising:
   a pouch surrounding an inner chamber and having a rupturing portion;
   an inner membrane positioned within the inner chamber to form a first cavity and a second cavity;
   a reagent in fluid form within the first cavity;

a housing spaced from at least a portion of the pouch; and a pin having a first end and an opposed second end, the first end of the pin supported by and attached to the housing, and the second end of the pin positioned adjacent to the rupturing portion of the pouch such that the pin is located between the pouch and the housing, the pin and housing being movable toward the pouch to permit the second end of the pin to selectively break the rupturing portion, the second end of the pin having a sharp edge configured to penetrate the rupturing portion;

wherein the second cavity houses a gas stored under pressure such that rupturing the rupturing portion causes a pressure imbalance whereby the inner membrane deforms into the first cavity and pushes the contents of the first cavity into a channel of the microfluidic chip.

2. A microfluidic product pouch assembly for use in a microfluidic chip having a first surface and a second surface, comprising:

a pouch surrounding an inner chamber and having a rupturing portion;

an inner membrane positioned within the inner chamber to form a first cavity and a second cavity;

a reagent in fluid form within the first cavity;

a housing forming the first surface of the microfluidic chip; and a plunger supported by the housing, and having a contact member movable relative to the pouch to selectively break the rupturing portion, the plunger having a rod connected to the contact member, the rod extendable through and/or beyond the first surface of the microfluidic chip, the contact member positioned between the housing and the pouch;

wherein the second cavity houses a gas stored under pressure such that rupturing the rupturing portion causes a pressure imbalance whereby the inner membrane deforms into the first cavity and pushes the contents of the first cavity into a channel of the microfluidic chip.

3. The microfluidic product pouch of claim 2, wherein the plunger includes a rod connected to a contact member having a substantially flat surface.

4. The microfluidic product pouch of claim 3, wherein the pouch further includes a deformable membrane, the flat surface of the plunger configured to provide pressure to the deformable membrane to break the rupturing portion of the pouch.

5. The microfluidic product pouch of claim 3, wherein the plunger includes a first end and a second end, the first end configured to form fit within the second cavity of the inner chamber.

6. A microfluidic product pouch assembly for use in a microfluidic chip having a first surface and a second surface, comprising:

a first pouch surrounding an inner chamber and having a rupturing portion;

an inner membrane positioned within the inner chamber to form a first cavity and a second cavity;

a reagent in fluid form within the first cavity;

a roller rotatingly movable relative to the pouch to selectively break the rupturing portion;

wherein the second cavity houses a gas stored under pressure such that rupturing the rupturing portion causes a pressure imbalance whereby the inner membrane deforms into the first cavity and pushes the contents of the first cavity into a channel of the microfluidic chip.

7. The microfluidic product pouch of claim 6, wherein the second cavity is an elongated cavity having a first end and a second end, the first cavity positioned at the second end of the cavity and the roller configured to rotatingly move from the first end to the second end of the elongated cavity.

8. The microfluidic pouch assembly of claim 1, wherein the pressurized gas is helium, or nitrogen.

* * * * *